US012433608B2

(12) United States Patent
Alambeigi et al.

(10) Patent No.: US 12,433,608 B2
(45) Date of Patent: Oct. 7, 2025

(54) FULLY STEERABLE FLEXIBLE CURVED-DRILLING ROBOT DEVICE, SYSTEM AND METHOD

(71) Applicant: Board of Regents, The University of Texas System, Austin, TX (US)

(72) Inventors: Farshid Alambeigi, Austin, TX (US); Yang Liu, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 44 days.

(21) Appl. No.: 18/681,266

(22) PCT Filed: Aug. 19, 2022

(86) PCT No.: PCT/US2022/075192
§ 371 (c)(1),
(2) Date: Feb. 5, 2024

(87) PCT Pub. No.: WO2023/023634
PCT Pub. Date: Feb. 23, 2023

(65) Prior Publication Data
US 2024/0341775 A1  Oct. 17, 2024

Related U.S. Application Data

(60) Provisional application No. 63/234,889, filed on Aug. 19, 2021.

(51) Int. Cl.
*A61B 17/16* (2006.01)
*A61B 34/10* (2016.01)
*A61B 34/30* (2016.01)

(52) U.S. Cl.
CPC ...... *A61B 17/1631* (2013.01); *A61B 17/1615* (2013.01); *A61B 17/1626* (2013.01);
(Continued)

(58) Field of Classification Search
CPC . A61B 17/16; A61B 17/1613; A61B 17/1615; A61B 17/1617; A61B 17/162;
(Continued)

(56) References Cited

U.S. PATENT DOCUMENTS

| 5,755,731 A | 5/1998 | Grinberg |
| 8,152,756 B2 * | 4/2012 | Webster ............. A61B 17/3478 604/95.01 |

(Continued)

FOREIGN PATENT DOCUMENTS

| CA | 2373715 C * 12/2008 | ......... A61B 17/1671 |
| CN | 112294392 A * 2/2021 | ......... A61B 17/1615 |

(Continued)

OTHER PUBLICATIONS

F. Alambeigi et al., "A Curved-Drilling Approach in Core Decompression of the Femoral Head Osteonecrosis Using a Continuum Manipulator," in IEEE Robotics and Automation Letters, vol. 2, No. 3, pp. 1480-1487, Jul. 2017, doi: 10.1109/LRA.2017.2668469.

(Continued)

*Primary Examiner* — Eric S Gibson
(74) *Attorney, Agent, or Firm* — Riverside Law LLP

(57) ABSTRACT

A fully steerable flexible curved drilling robot device comprises a first flexible tube including a concentric through hole centered on a longitudinal axis, a second flexible tube including an eccentric through hole, wherein the second flexible tube is positioned in the concentric though hole of the first flexible tube, and configured to move translationally along the longitudinal axis and rotationally about the longitudinal axis, and a drill bit connected via a bearing to a flexible drive shaft, the drill bit positioned at a distal end of the first flexible tube, and wherein the flexible drive shaft extends through the eccentric through hole of the second flexible tube and is configured to provide a rotational torque (Continued)

to the drill bit. A steerable flexible curved drilling robot system and drilling method are also disclosed.

21 Claims, 17 Drawing Sheets

(52) U.S. Cl.
CPC .......... *A61B 17/1628* (2013.01); *A61B 34/10* (2016.02); *A61B 34/30* (2016.02); *A61B 2034/105* (2016.02)

(58) Field of Classification Search
CPC ............ A61B 17/1622; A61B 17/1624; A61B 17/1626; A61B 17/1628; A61B 17/1631; A61B 17/1633; A61B 17/1642; A61B 17/1671; A61B 34/10; A61B 34/30; A61B 2034/101; A61B 2034/102; A61B 2034/104; A61B 2034/105; A61B 2034/301; B23B 2251/249; B23B 2260/068; B23B 39/14

See application file for complete search history.

(56) References Cited

U.S. PATENT DOCUMENTS

| | | | |
|---|---|---|---|
| 9,642,629 B2 * | 5/2017 | Griffiths | A61B 17/1637 |
| 10,856,889 B1 * | 12/2020 | Burley | A61B 17/1631 |
| 11,559,315 B2 * | 1/2023 | Sharifi-Mehr | A61B 17/1671 |
| 11,793,526 B2 * | 10/2023 | Alambeigi | A61B 17/1622 |
| 12,064,124 B2 * | 8/2024 | Sharifi-Mehr | A61B 17/1617 |
| 12,082,886 B2 * | 9/2024 | Kostrzewski | A61B 34/30 |
| 12,303,166 B2 * | 5/2025 | Pellegrino | A61N 7/00 |
| 2002/0016599 A1 | 2/2002 | Kienzle | |
| 2003/0097133 A1 * | 5/2003 | Green | A61B 17/164 606/80 |
| 2008/0188854 A1 * | 8/2008 | Moser | A61B 17/1631 606/80 |
| 2010/0298832 A1 * | 11/2010 | Lau | A61B 17/8819 606/86 R |
| 2011/0319896 A1 * | 12/2011 | Papenfuss | A61B 17/1631 606/79 |
| 2014/0107657 A1 * | 4/2014 | Norton | A61B 17/88 606/232 |
| 2014/0171948 A1 * | 6/2014 | Griffiths | A61B 17/1637 29/428 |
| 2014/0214040 A1 * | 7/2014 | Carl | A61B 17/1642 606/80 |
| 2014/0324052 A1 * | 10/2014 | Carrison | A61B 17/1617 606/80 |
| 2016/0022283 A1 * | 1/2016 | Wallace | A61B 17/22012 606/79 |
| 2016/0166341 A1 * | 6/2016 | Iordachita | A61B 34/71 250/227.14 |
| 2017/0202567 A1 * | 7/2017 | Griffiths | A61B 17/1631 |
| 2018/0084985 A1 * | 3/2018 | Saw | A61B 17/1615 |
| 2020/0000480 A1 * | 1/2020 | Alambeigi | B23B 39/14 |
| 2021/0100567 A1 * | 4/2021 | Sharifi-Mehr | A61B 17/3496 |
| 2022/0079688 A1 * | 3/2022 | Kostrzewski | A61B 17/1626 |
| 2023/0017664 A1 * | 1/2023 | Sharifi-Mehr | A61B 34/30 |
| 2023/0372032 A1 * | 11/2023 | Gormley | G16H 20/40 |
| 2024/0341775 A1 * | 10/2024 | Alambeigi | A61B 17/1626 |
| 2024/0398424 A1 * | 12/2024 | Alambeigi | A61B 34/30 |

FOREIGN PATENT DOCUMENTS

| | | | | |
|---|---|---|---|---|
| CN | 113456925 A | * | 10/2021 | |
| CN | 113950296 A | * | 1/2022 | ......... A61B 17/3403 |
| CN | 115038398 A | * | 9/2022 | ......... A61B 17/3468 |
| CN | 113950296 B | * | 9/2024 | ......... A61B 17/3403 |
| CN | 119385640 A | * | 2/2025 | |
| EP | 1191889 B1 | * | 7/2011 | ......... A61B 17/1671 |
| EP | 3799805 A2 | * | 4/2021 | ......... A61B 17/1617 |
| WO | WO-2014081759 A1 | * | 5/2014 | ......... A61B 17/1615 |
| WO | WO-2018160269 A1 | * | 9/2018 | ....... A61B 17/00234 |
| WO | WO-2018226490 A1 | * | 12/2018 | ......... A61B 17/0401 |
| WO | WO-2023023634 A1 | * | 2/2023 | ......... A61B 17/1615 |
| WO | WO-2023077071 A1 | * | 5/2023 | ......... A61B 17/1626 |

OTHER PUBLICATIONS

Ma, Justin H., et al. "An Active Steering Hand-Held Robotic System for Minimally Invasive Orthopaedic Surgery Using a Continuum Manipulator." IEEE Robotics and Automation Letters 6.2 (2021): 1622-1629.

Wang, Yan, et al. "Design and Experimental Validation of a Miniaturized Robotic Tendon-Driven Articulated Surgical Drill for Enhancing Distal Dexterity in Minimally Invasive Spine Fusion." IEEE/ASME Transactions on Mechatronics (2021). 9 pages.

* cited by examiner

FULLY STEERABLE FLEXIBLE CURVED-DRILLING ROBOT DEVICE, SYSTEM AND METHOD

CROSS-REFERENCE TO RELATED APPLICATIONS

This application is a U.S. national phase application filed under 35 U.S.C. § 371 claiming benefit to International Patent Application No. PCT/US2022/075192, filed Aug. 19, 2022, which is entitled to priority of U.S. Provisional Patent Application No. 63/234,889, filed Aug. 19, 2021, the contents of which are each incorporated by reference herein in their entirety.

STATEMENT REGARDING FEDERALLY SPONSORED RESEARCH OR DEVELOPMENT

This invention was made with government support under R21 EB030796 awarded by the National Institutes of Health. The government has certain rights in the invention.

BACKGROUND OF THE INVENTION

Screw implants are commonly used to stabilize bone fractures, reconstruct bone after tumor resection or destruction from infection, and treat congenital and acquired degenerative diseases. Screw fixation usually inserts rigid bone screws through strong cortical bone and into the more porous cancellous bone. The screws can then be rigidly connected with locking rods to ideally provide a stable fixation and load sharing feature before a robust bone fusion or healing occurs. However, screw fixation suffers from various types of complications and failures, including but not limited to screw misplacement, screw fracture, bone fracture, and loosening and pullout of screw implants. In particular, while loosening and pullout of screw implants is a prevalent problem in osteoporotic bone, it is also a common occurrence in bones with normal and healthy bone mineral density (BMD).

The reasons for the inadequacy of screw implants in bone are manifold. Screw implant sites in bone must deal with narrow and confined anatomical constraints, limiting the angles of approach for the screws. Nerves and blood vessels also must be avoided from the screw path. Additional obstacles are regions of low BMD. Fixation strength and quality of screw implant fixation directly depend on the BMD of an implant site. Traditional drilling instruments and screws are rigid and lack the sufficient dexterity to navigate the aforementioned anatomical constraints, limiting implant trajectories to linear paths that often lead to screw misplacement and nerve injury and necessarily cross low BMD regions.

Thus, there is a need in the art for improved devices and methods for implant fixation in bone that are adapted for a subject's bone mineral density. Particularly, there is a need for devices that can drill in long curved trajectories inside bones with complex curved anatomies such as the pelvis and vertebrae, for example. The present invention meets this need.

SUMMARY OF THE INVENTION

Some embodiments of the invention disclosed herein are set forth below, and any combination of these embodiments (or portions thereof) may be made to define another embodiment.

In one aspect a fully steerable flexible curved drilling robot device comprises a first flexible tube including a proximal end, a distal end, and a concentric through hole centered on a longitudinal axis extending from the proximal end to the distal end, a second flexible tube including a proximal end, a distal end, and an eccentric through hole extending from the proximal end to the distal end, wherein the second flexible tube is positioned in the concentric though hole of the first flexible tube, and configured to move translationally along the longitudinal axis and rotationally about the longitudinal axis, and a drill bit connected via a bearing to a flexible drive shaft, the drill bit positioned at the distal end of the first flexible tube, and wherein the flexible drive shaft extends through the eccentric through hole of the second flexible tube and is configured to provide a rotational torque to the drill bit.

In one embodiment, the first flexible tube comprises at least one of Nitinol, titanium, stainless steel, 3D printed biocompatible resin, and 3D printed metal. In one embodiment, the first flexible tube has a diameter in the range of 2 mm to 10 mm, a length in the range of 20 mm to 500 mm, and a wall thickness in the range of 0.05 mm to 2 mm. In one embodiment, the concentric through hole of the first flexible tube has a diameter in the range of 1 mm to 10 mm.

In one embodiment, the second flexible tube comprises at least one of Nitinol, titanium, stainless steel, 3D printed biocompatible resin, and 3D printed metal. In one embodiment, the second flexible tube has a diameter in the range of 1 mm to 10 mm, a length in the range of 20 mm to 500 mm, and a wall thickness in the range of 0.05 mm to 2 mm. In one embodiment, the eccentric through hole of the second flexible tube has a diameter in the range of 0.1 mm to 5 mm.

In one embodiment, the flexible drive shaft comprises at least one of Nitinol, titanium, stainless steel, 3D printed biocompatible resin, and 3D printed metal. In one embodiment, the flexible drive shaft has a diameter in the range of 0.5 mm to 5 mm, and a length in the range of 20 mm to 500 mm. In one embodiment, the drill bit comprises at least one of high-speed steel, diamond, and biocompatible hard material, and at least one of a ball, a conical and a spherical shape. In one embodiment, a combination of a rotation and a translation of the second flexible tube relative to the first flexible tube is configured to control the directionality of a tip of the drill bit.

In another aspect a fully steerable flexible curved drilling robot system comprises an actuation system configured to provide a first torque, a second torque, a first translational force, and a second translational force, and a fully steerable flexible curved drilling robot device movably connected to the actuation system, comprising a first flexible tube including a proximal end, a distal end, and a concentric through hole centered on a longitudinal axis extending from the proximal end to the distal end, a second flexible tube including a proximal end, a distal end, and an eccentric through hole extending from the proximal end to the distal end, wherein the second flexible tube is positioned in the concentric though hole of the first flexible tube, and configured to move translationally along the longitudinal axis and rotationally about the longitudinal axis, and a drill bit connected via a bearing to a flexible drive shaft, the drill bit positioned at the distal end of the first flexible tube, and wherein the flexible drive shaft extends through the eccentric through hole of the second flexible tube and is configured to transfer the first torque from the actuation system to the drill bit.

In one embodiment, the actuation system comprises a first linear actuation device configured to provide the first translational force to the first flexible tube, a second linear actuation device configured to provide the second translational force to the second flexible tube, a first rotational actuation device configured to provide the first torque to the flexible drive shaft and drill bit, and a second rotational actuation device configured to provide the second torque to the second flexible tube.

In one embodiment, the first and second linear actuation devices each comprise a leadscrew, stepper motor, rail, and a slide, the first rotational actuation device comprises a DC motor, and the second rotational actuation device comprises worm gear set and a planetary gear stepper motor.

In another aspect, a fully steerable curved drilling method comprises providing a fully steerable flexible curved drilling robot device comprising a first flexible tube including a proximal end, a distal end, and a concentric through hole centered on a longitudinal axis extending from the proximal end to the distal end, a second flexible tube including a proximal end, a distal end, and an eccentric through hole extending from the proximal end to the distal end, wherein the second flexible tube is positioned in the concentric though hole of the first flexible tube, and configured to move translationally along the longitudinal axis and rotationally about the longitudinal axis, and a drill bit connected via a spherical bearing to a flexible drive shaft, the drill bit positioned at the distal end of the first flexible tube, and wherein the flexible drive shaft extends through the eccentric through hole of the second flexible tube and is configured to provide a rotational torque to the drill bit, and steering the drill bit via a combination of a first torque, a second torque, a first translational force, and a second translational force to drill a drilling trajectory.

In one embodiment, the method further comprises characterizing a target bone tissue including identifying regions of osteoporotic bone and bone with low mineral density, and forming the drilling trajectory based on the characterization. In one embodiment, the drilling trajectory is configured to avoid the identified regions of osteoporotic bone and bone with low mineral density. In one embodiment, the drilling trajectory is configured to follow a three dimensional curved, long, and complex anatomy in which nerves and vessels need to be avoided during the drilling procedure.

In one embodiment, the step of characterizing the target bone tissue comprises the steps of performing one or more quantitative computed tomography (QCT) scans on the target bone tissue, converting the one or more QCT scans into a three-dimensional finite element model of the target bone tissue, and demarcating osteoporotic regions or low bone mineral density regions in the three-dimensional finite element model.

In one embodiment, the first torque, second torque, first translational force, and second translational force are provided by an actuation system. In one embodiment, the actuation system comprises a first linear actuation device configured to provide the first translational force to the first flexible tube, a second linear actuation device configured to provide the second translational force to the second flexible tube, a first rotational actuation device configured to provide the first torque to the flexible drive shaft and drill bit, and a second rotational actuation device configured to provide the second torque to the second flexible tube.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1:
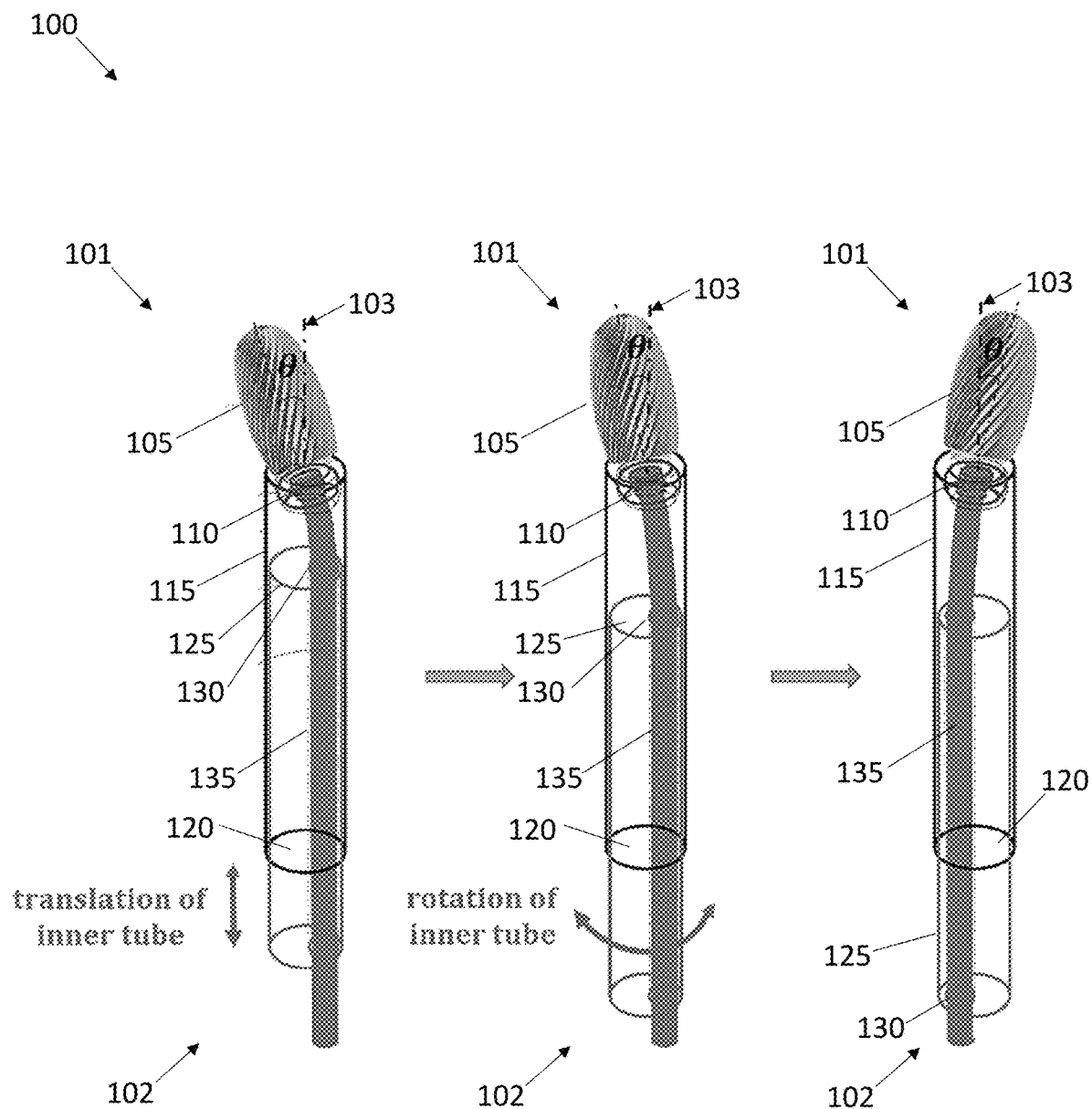
FIG. 1 depicts an example steerable flexible curved drilling robot device in accordance with some embodiments.

It is to be understood that the figures and descriptions of the present invention have been simplified to illustrate elements that are relevant for a more clear comprehension of the present invention, while eliminating, for the purpose of clarity, many other elements found in systems and methods of steerable flexible curved drilling. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a steerable flexible curved drilling robot device, system and method.

A steerable flexible curved drilling robot device and system with associated curved drilling method can be utilized for a variety of applications such as surgical interventions requiring complex 3D curved drilling trajectories in hard tissues, for example. The device and system provide for greater maneuverability and better drilling trajectory customization, while allowing for smaller surgical incisions, less trauma and increased surgical implant performance by being able to avoid obstacles and target desired tissues.

Figure 2:
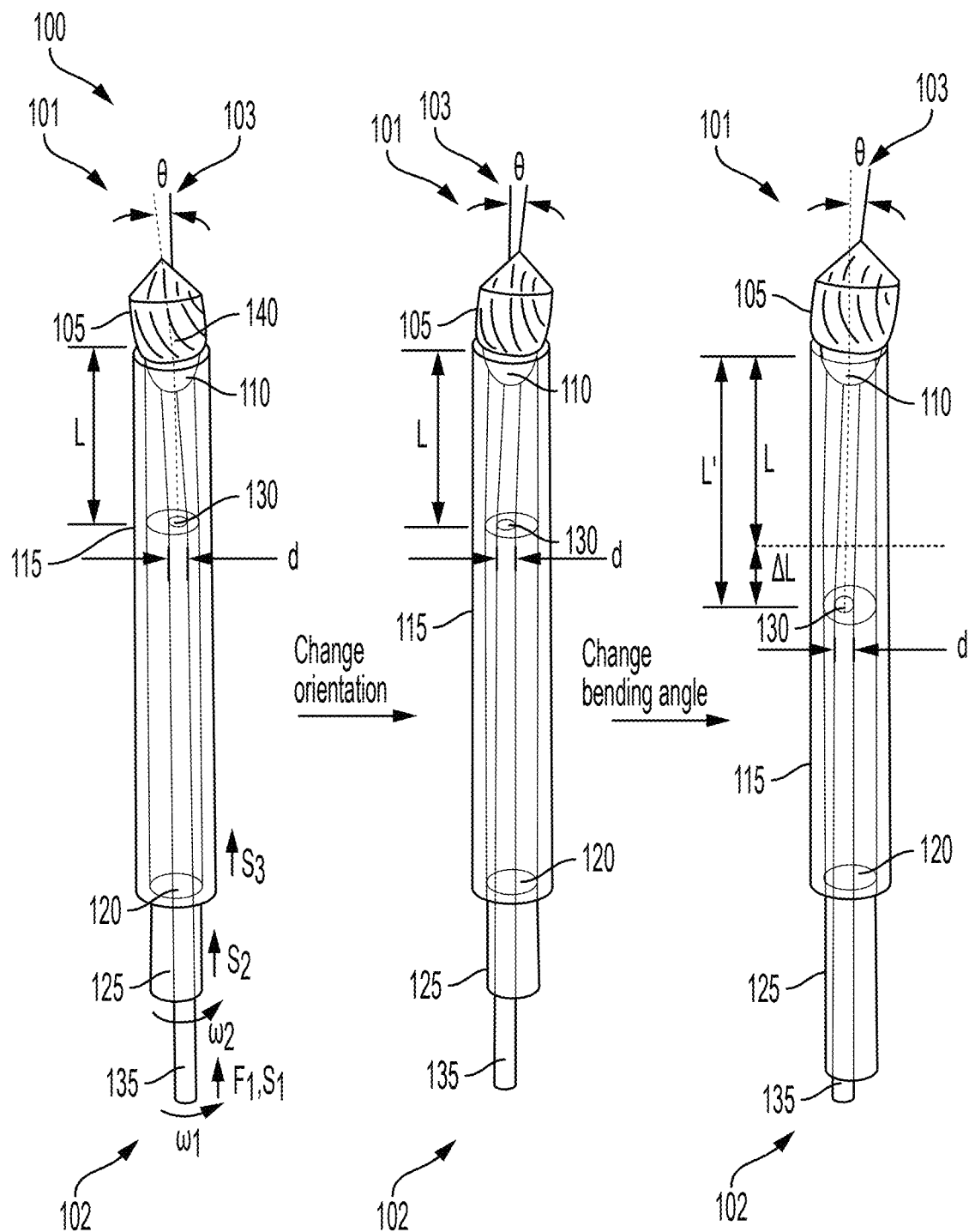
FIG. 2 depicts schematics showing further details of a steerable flexible curved drilling robot device in accordance with some embodiments.
Figure 3:
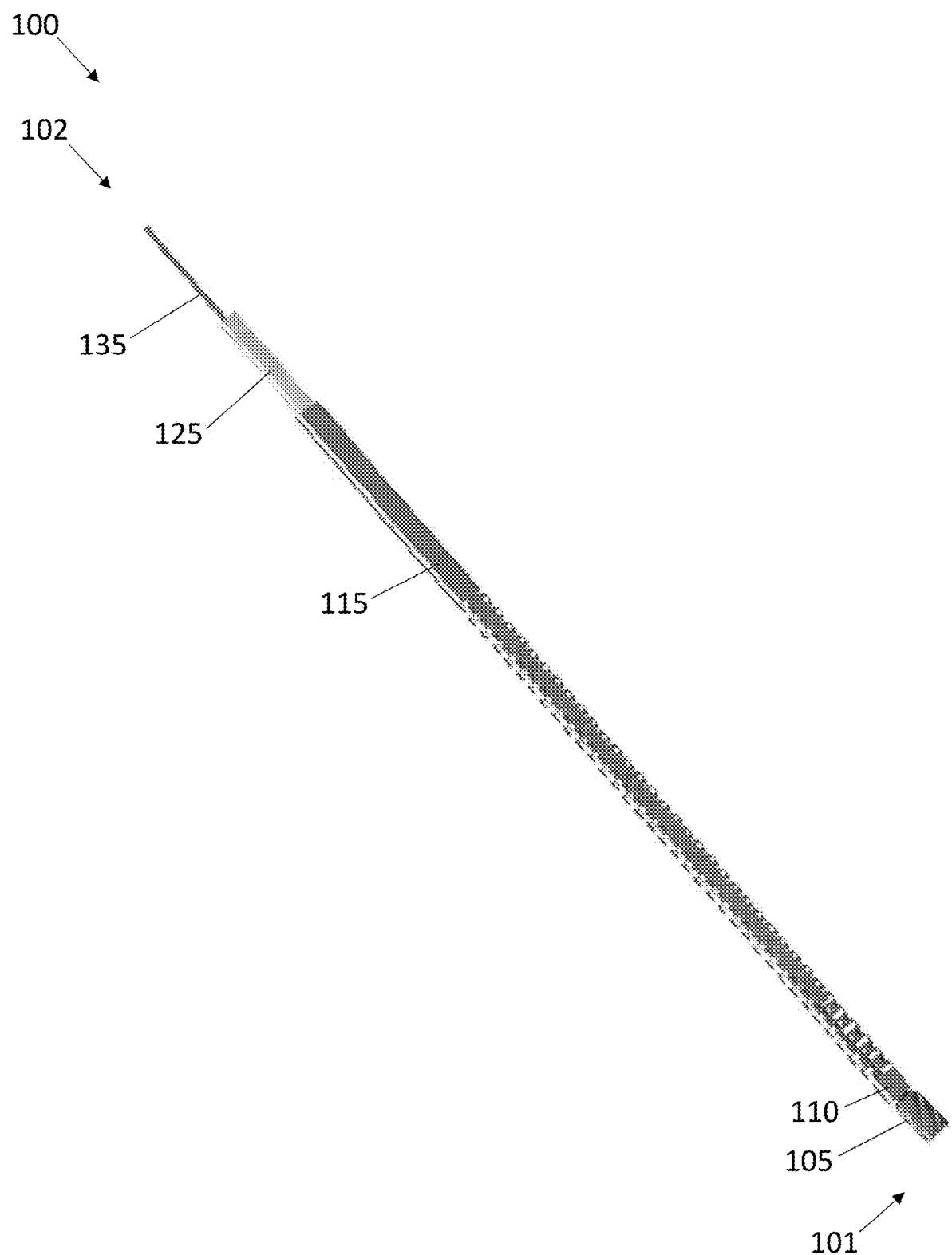
FIG. 3 shows an example steerable flexible curved drilling robot device in a first configuration in accordance with some embodiments.
Figure 4:
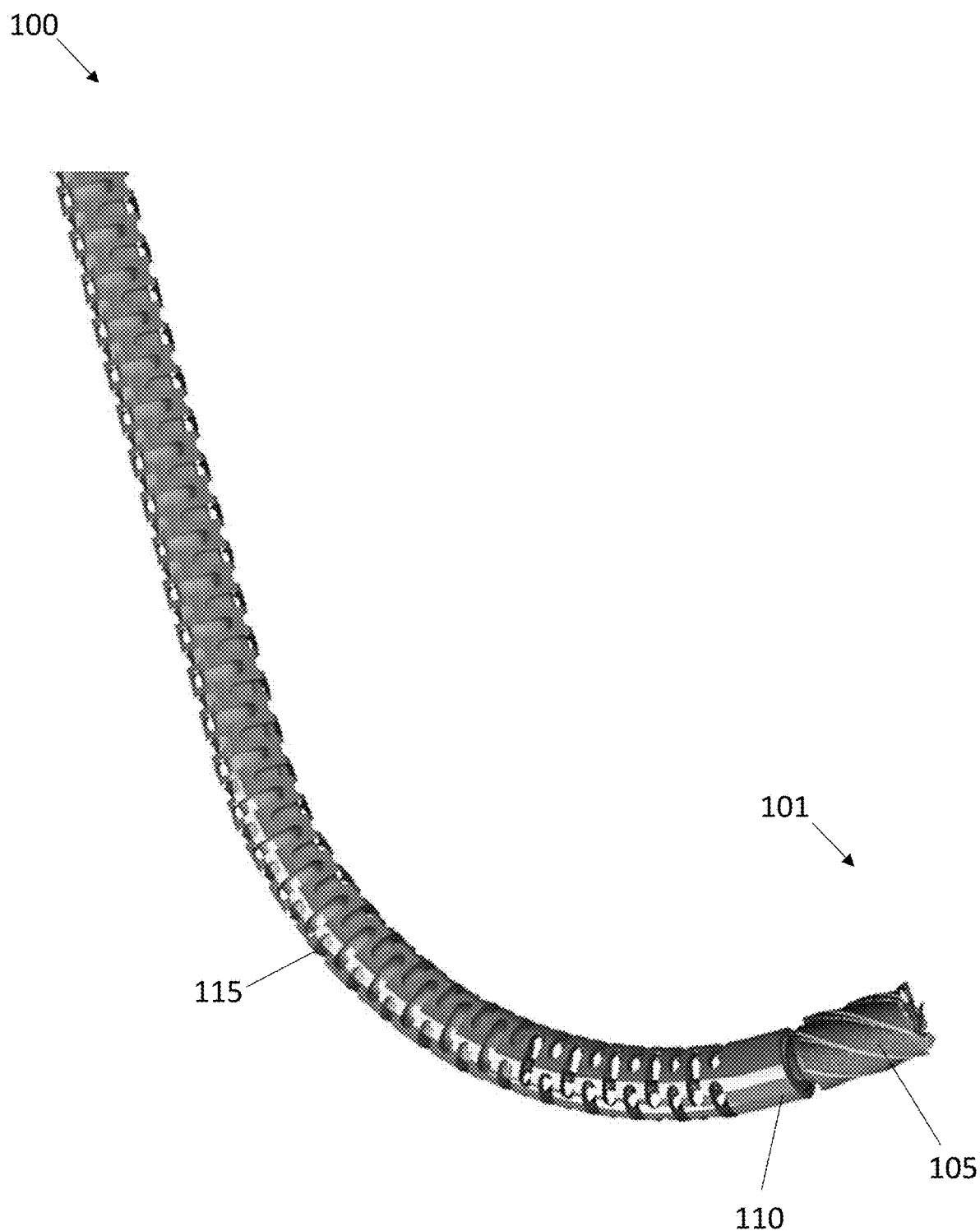
FIG. 4 shows an example steerable flexible curved drilling robot device in a second configuration in accordance with some embodiments.
Figure 5:
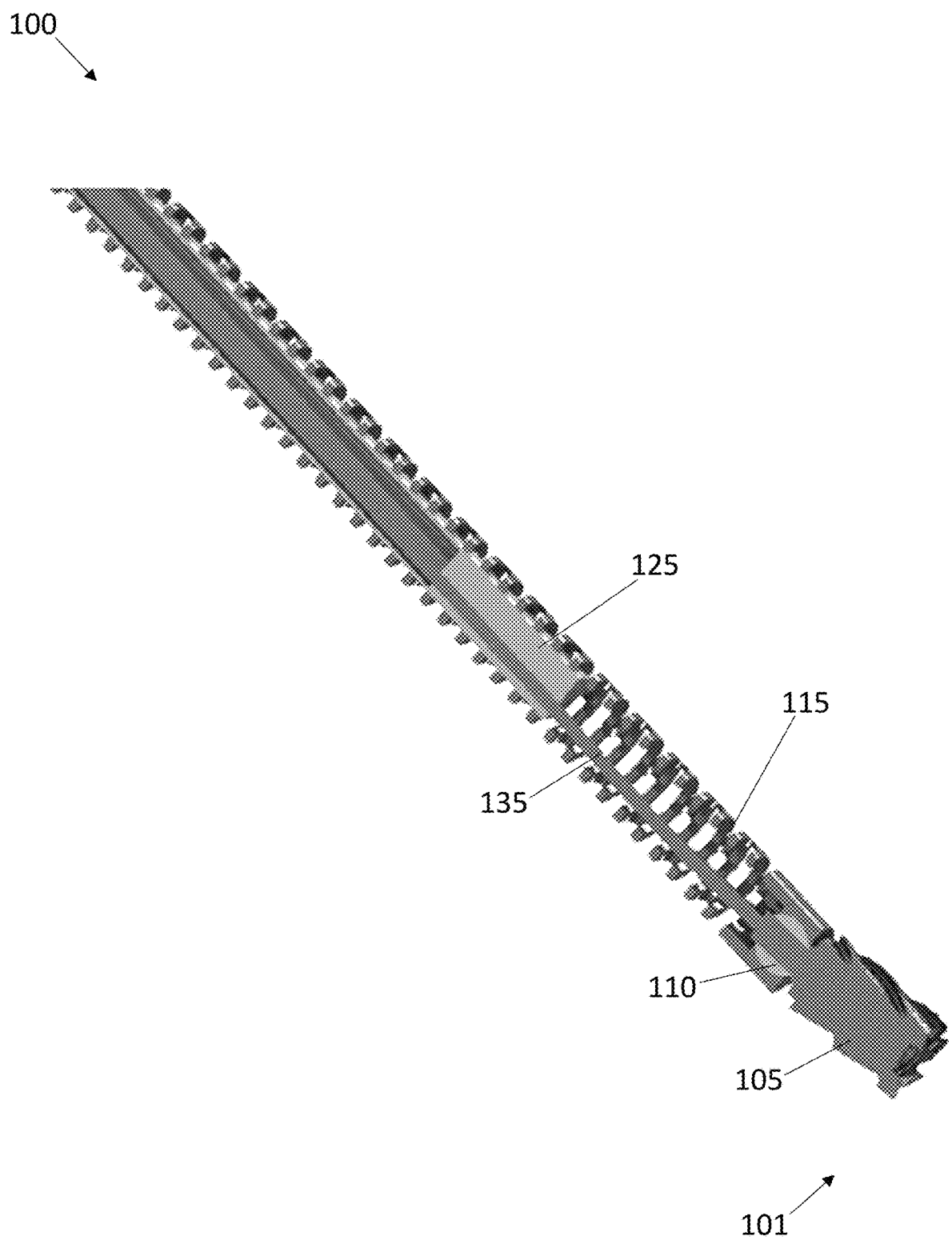
FIG. 5 shows a cross sectional view of a steerable flexible curved drilling robot device in accordance with some embodiments.

FIGS. 1 through 5 show example embodiments of a steerable flexible curved drilling robot device 100. FIG. 1 shows an example steerable flexible curved drilling robot device 100, FIG. 2 shows schematics showing further details of the device 100, FIGS. 3 and 4 show example configurations of the device 100, and FIG. 5 shows a cross sectional view of the device 100.

In some embodiments the steerable flexible curved drilling robot device 100 comprises a first (outer) flexible tube 115 including a proximal end 102, a distal end 101, and a concentric through hole 120 centered on a longitudinal axis 103 extending from the proximal end 102 to the distal end 101. In some embodiments, the first flexible tube 115 comprises Nitinol, stainless steel, titanium and/or other biocompatible materials (e.g., 3D printed biocompatible resins, metals, and materials). The first flexible tube 115 can have any desired dimensions. In some embodiments, and dependent on the application, the first flexible tube 115 can have a diameter in the range of 2 mm to 10 mm, a length in the range of 20 mm to 500 mm, a wall thickness in the range of 0.05 mm to 2 mm, and the concentric through hole 120 of the first flexible tube 115 can have a diameter in the range of 1 mm to 10 mm. These dimensions are merely examples and can be modified based on the application.

In some embodiments, the flexible curved drilling robot device 100 comprises a second (inner) flexible tube 125 including a proximal end 102, a distal end 101, and an eccentric through hole 130 extending from the proximal end 102 to the distal end 101. In one embodiment, the second flexible tube 125 is positioned in the concentric though hole 120 of the first flexible tube 115, and is configured to move translationally along the longitudinal axis 103 and/or rotationally about the longitudinal axis 103. In some embodiments, the second flexible tube 125 comprises Nitinol, stainless steel, titanium and/or other biocompatible materials (e.g., 3D printed biocompatible resins, metals, and materials). The second flexible tube 125 can have any desired dimensions. In some embodiments, and dependent on the application, the second flexible tube 125 can have a diameter in the range of 1 mm to 10 mm, a length in the range of 20 mm to 500 mm, a wall thickness in the range of 0.05 mm to 2 mm, and the eccentric through hole 130 of the second flexible tube 125 can have a diameter in the range of 0.1 mm to 5 mm. These dimensions are merely examples and can be modified based on the application.

In some embodiments, a drill bit 105 is connected via a bearing 110 to a flexible drive shaft 135 and the first flexible tube 115. In one embodiment, the drill bit 105 is positioned at the distal end 101 of the first flexible tube 115. In some embodiments, the bearing 110 comprises a spherical bearing centered on a spherical joint center 140. In some embodiments, the flexible drive shaft 135 extends through the eccentric through hole 130 of the second flexible tube 125 and is configured to provide a rotational torque to the drill bit 105. In some embodiments, the flexible drive shaft 135 comprises Nitinol, stainless steel, titanium and/or other biocompatible materials (e.g., 3D printed biocompatible resins, metals, and materials). The flexible drive shaft 135 can have any desired dimensions. In some embodiments, and dependent on the application, the flexible drive shaft 135 can have a diameter in the range of 0.5 mm to 5 mm, and a length in the range of 20 mm to 500 mm. These dimensions are merely examples and can be modified based on the application.

In some embodiments, the drill bit 105 comprises a high-speed steel, diamond and/or similar biocompatible hard material currently used for drilling hard tissue. In some embodiments, the drill bit 105 comprises a ball, conical, spherical and/or other suitable shape. The size, type, shape, and material of the drill bit 105 can be selected based on the density and location of the bone and the target anatomy.

The device 100 can utilize a combination of a rotation and a translation of the second flexible tube 125 relative to the first flexible tube 115 to control the directionality of the tip of the drill bit, and thus control the steering of the device 100. By controlling the drill bit 105 tip orientation the device can follow and drill a specific drilling trajectory. The orientation of the drill bit 105 tip can be set by flexing the flexible drive shaft 135 via the rotation and translation of the second flexible tube 125 relative to the first flexible tube 115.

With reference now to FIG. 2, $\omega1$ denotes the angular velocity of the flexible drive shaft 135 and the drill bit 105 (drilling speed). F1 denotes the insertion force or the contact force between the drill bit 105 and material being drilled. S1 denotes the insertion displacement of the flexible drive shaft 135. S2 denotes the insertion displacement of the second (inner) flexible tube 125. S3 denotes the insertion displacement of the first (outer) flexible tube 115. The combination of the translational motions can be used to control the bending angle $\theta$ of the drill bit 105. The mathematical relation can be obtained as follows:

$$\theta = \tan^{-1}\left(\frac{d}{l}\right) \quad (1)$$

where d is the distance between the neutral axis of the flexible drive shaft 135 and the longitudinal axis 103 of the first and second flexible tubes (115, 125). l is the distance between the distal end 101 of the second (inner) flexible tube 125 and the center of the bearing 110. d is a constant set by the location of the eccentric though hole 130, and l can be controlled by the translation motion S2 of the second (inner) flexible tube 125. Additionally, the angular orientation of the drill bit 105 can be controlled by the rotational motion of the second (inner) flexible tube 125.

Figure 6:
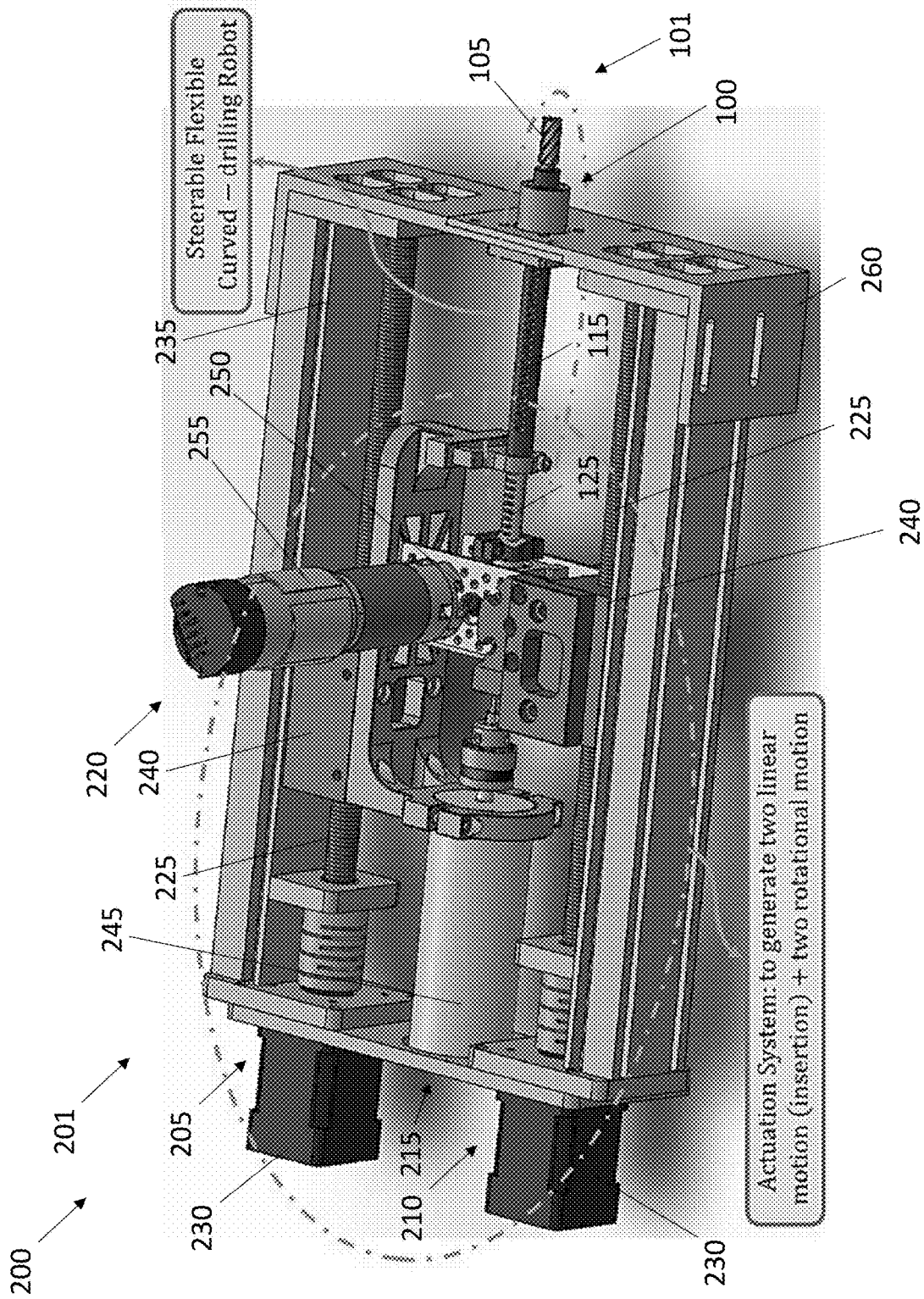
FIG. 6 depicts an example steerable flexible curved drilling robot system in accordance with some embodiments.
Figure 7:
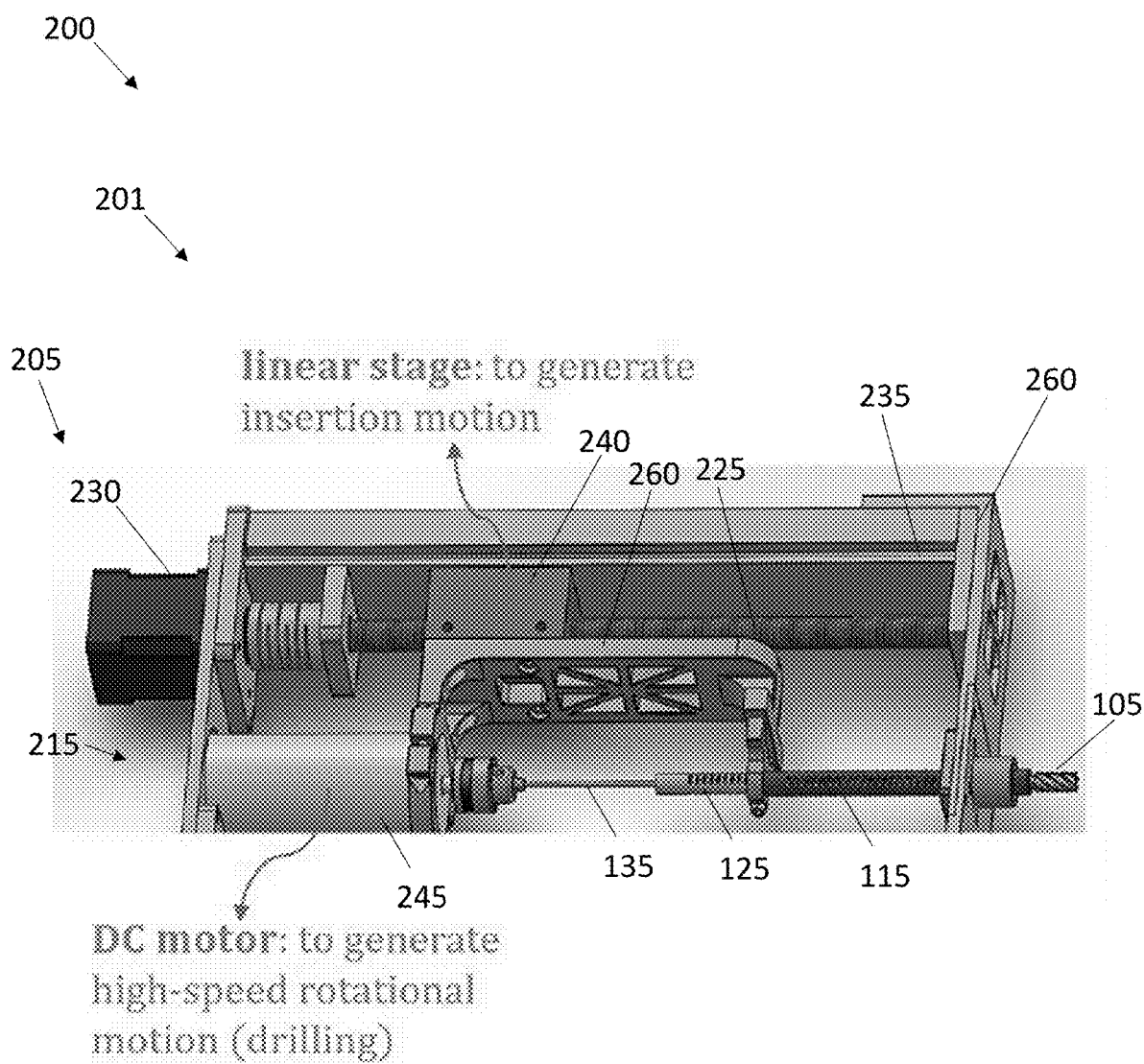
FIG. 7 shows a detail view of a portion of an example steerable flexible curved drilling robot system in accordance with some embodiments.
Figure 8:
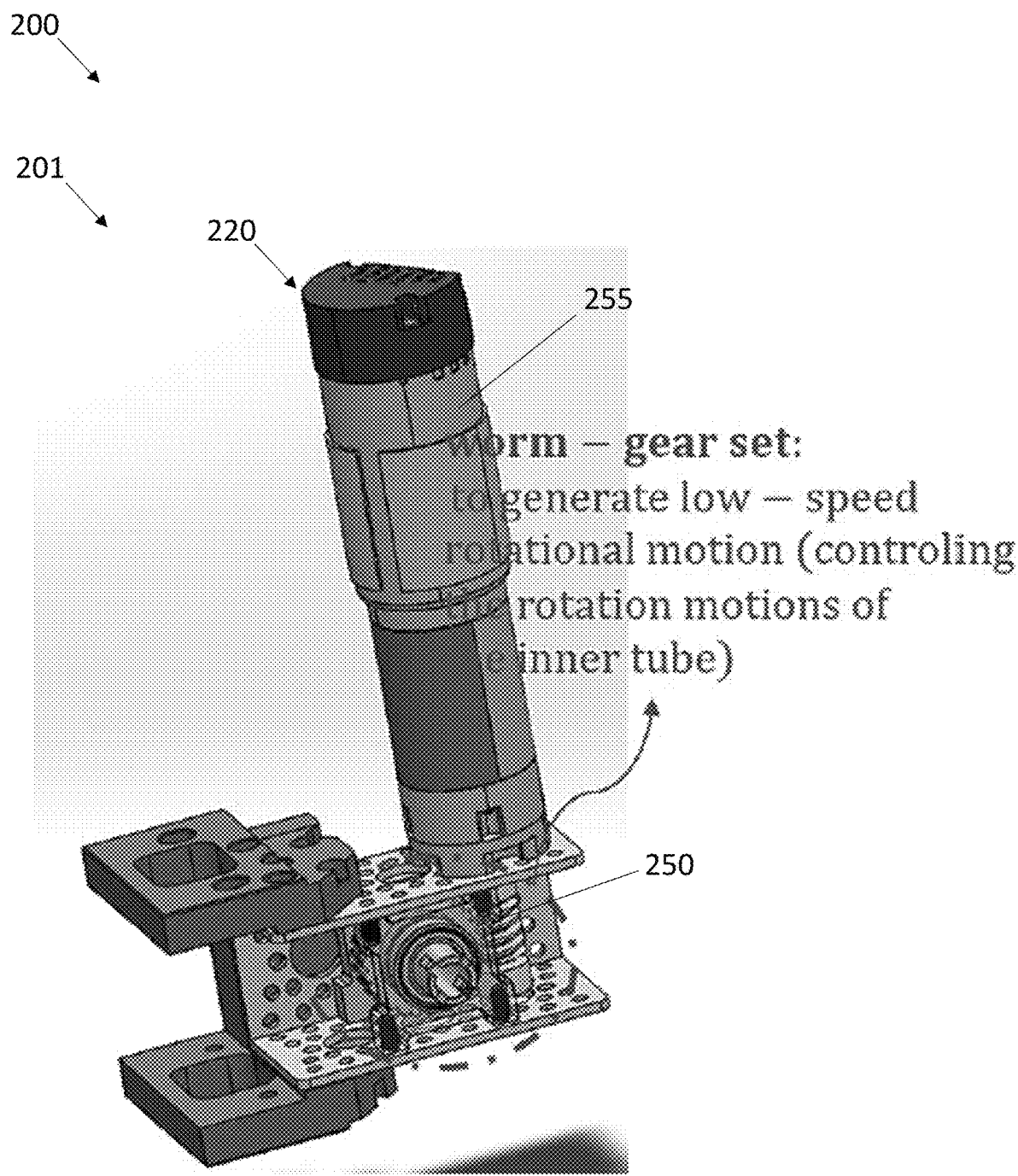
FIG. 8 shows a detail view of portion of an example steerable flexible curved drilling robot system in accordance with some embodiments.

Referring now to FIGS. 6 through 8, an example steerable flexible curved drilling robot system 200 is depicted. FIG. 6 is a perspective view of the system 200, and FIGS. 7 and 8 are detailed views of portions of the system 200.

In some embodiments, the system 200 comprises an actuation system 201 configured to provide a first torque, a second torque, a first translational force, and a second translational force, and a steerable flexible curved drilling robot device 100 movably connected to the actuation system 201. In some embodiments, the actuation system 201 comprises a support structure 260, a first linear actuation device 205 configured to provide the first translational force to the first flexible tube 115, a second linear actuation device 210 configured to provide the second translational force to the second flexible tube 125, a first rotational actuation device 215 configured to provide the first torque to the flexible drive shaft 135 and drill bit 105, and a second rotational actuation device 220 configured to provide the second torque to the second flexible tube 125. While specific examples for the actuation devices (205, 210, 215, 220) are shown, any suitable actuation device or combination thereof can be utilized.

In some embodiments the first and second linear actuation devices (205, 210) each comprise a leadscrew 225, stepper motor 230, rail 235, and slide 240, the first rotational actuation device 215 can comprise a DC motor, and the second rotational actuation device 220 can comprise a worm gear set 250 and planetary gear stepper motor 255. In some embodiments, the system 200 provides for four degrees of freedom, which includes a translational motion of the first flexible tube 115, a translational motion of the second flexible tube 125, a rotational motion of the flexible drive shaft 135 and drill bit 105, and a rotational motion of the second flexible tube 125. In some embodiments, the system 200 can be about 30-50 cm long, about 10-30 cm wide, and about 10-30 cm tall. These dimensions are merely examples and can be modified based on the application.

Figure 9:
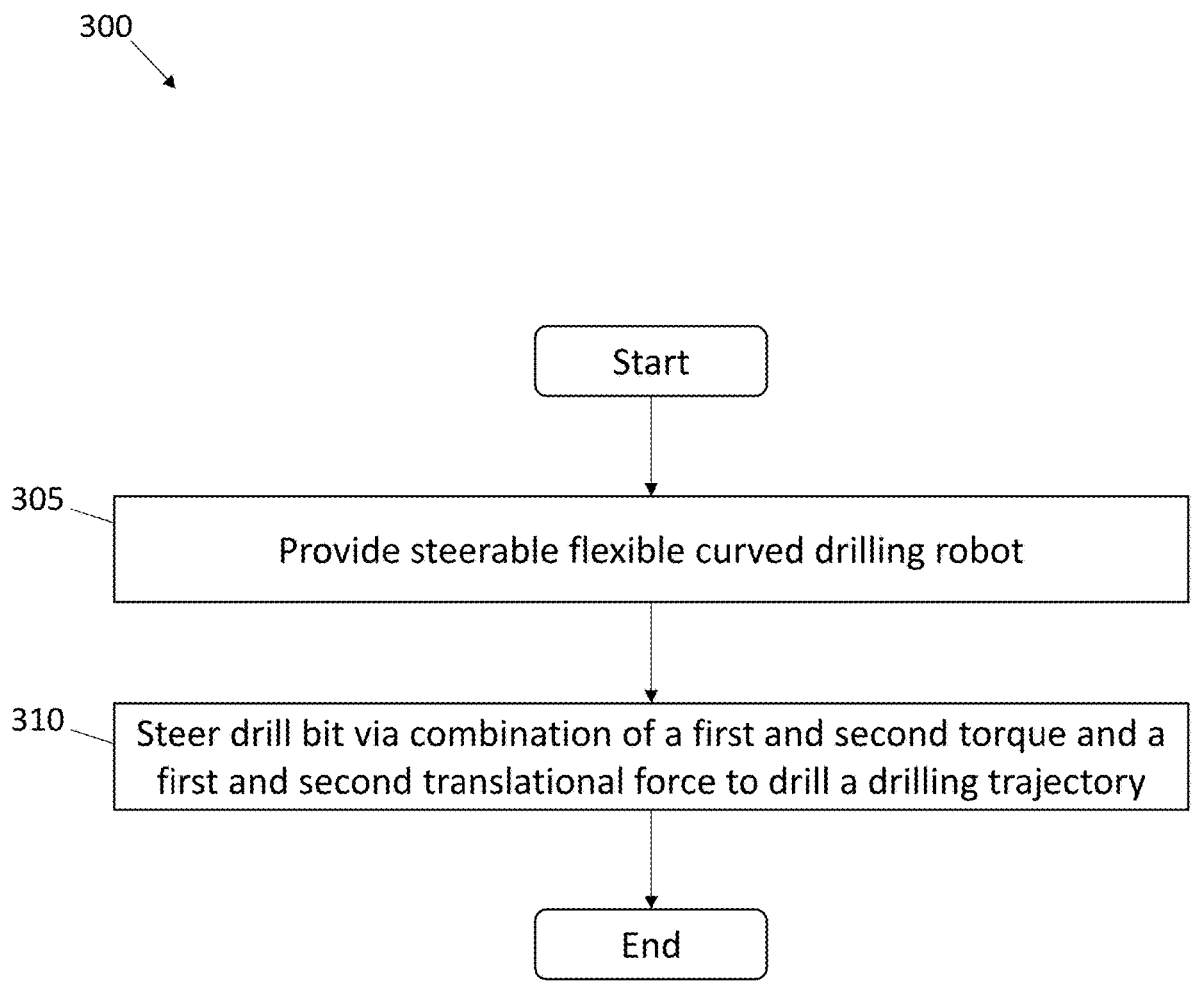
FIG. 9 is a flowchart depicting an example steerable curved drilling method in accordance with some embodiments.

In one aspect, the present invention provides a method of drilling a curved drilling trajectory. FIG. 9 is a flowchart showing an example steerable curved drilling method 300. The method 300 starts at Operation 305, where a flexible curved drilling robot device 100 is provided.

In some embodiments, the flexible curved drilling robot device 100 comprises a first (outer) flexible tube 115 including a proximal end 102, a distal end 101, and a concentric through hole 120 centered on a longitudinal axis 103 extending from the proximal end 102 to the distal end 101.

In some embodiments, the flexible curved drilling robot device 100 comprises a second (inner) flexible tube 125 including a proximal end 102, a distal end 101, and an eccentric through hole 130 extending from the proximal end 102 to the distal end 101. In one embodiment, the second flexible tube 125 is positioned in the concentric though hole 120 of the first flexible tube 115, and is configured to move translationally along the longitudinal axis 103 and/or rotationally about the longitudinal axis 103.

In some embodiments, a drill bit 105 is connected via a bearing 110 to a flexible drive shaft 135 and the first flexible tube 115. In one embodiment, the drill bit 105 is positioned at the distal end 101 of the first flexible tube 115. In some embodiments, the bearing 110 comprises a spherical bearing. In some embodiments, the flexible drive shaft 135 extends through the eccentric through hole 130 of the second flexible tube 125 and is configured to provide a rotational torque to the drill bit 105.

In one embodiment, the method 300 ends at Operation 310, where the drill bit 105 is steered via a combination of a first torque, a second torque, a first translational force, and a second translational force to drill a drilling trajectory.

In some embodiments, the first torque, second torque, first translational force, and second translational force are provided by an actuation system 201 of a steerable flexible curved drilling robot system 200. In some embodiments, the actuation system 201 comprises a first linear actuation device 205 configured to provide the first translational force to the first flexible tube 115, a second linear actuation device 210 configured to provide the second translational force to the second flexible tube 125, a first rotational actuation device 215 configured to provide the first torque to the flexible drive shaft 135 and drill bit 105, and a second rotational actuation device 220 configured to provide the second torque to the second flexible tube 125.

In some exemplary embodiments, the method 300 is optionally preceded by characterizing a target bone tissue of a subject and forming an implantation drilling trajectory based on the characterization. In some embodiments, bone mineral density in a target tissue is measured using quantitative computed tomography (QCT) along with a calibration phantom positioned near a subject. The calibration phantom comprises regions of known Hounsfield units that appear darker with lower densities and lighter with higher densities. Using the calibration phantom, the bone mineral density of the target tissue can be quantified. QCT images are segmented, and a three-dimensional finite element model is constructed based on them such that each element of the model has the material property of the corresponding voxel in the QCT images. In some embodiments, the three-dimensional model is used to design and analyze a custom implantation drilling trajectory. Furthermore, it can demarcate osteoporotic regions and low bone mineral density regions of the target tissue for which possible implantation drilling trajectories may avoid. While osteoporotic regions may be defined as having a bone mineral density of less than 80 mg/cm$^3$, it should be understood that any threshold may be used. For example, regions of bone mineral density may be characterized as low relative to the surrounding tissue, such that an optimal implantation drilling trajectory favors the higher density tissue over the lower density tissue, even if the lower density tissue has a bone mineral density greater than 80 mg/cm$^3$. An optimal implantation drilling trajectory may avoid osteoporotic regions and low bone mineral density regions, resulting in minimized strain and improved implant pullout strength when compared to conventional linear screw implantation drilling paths that are unable to evade osteoporotic regions and low bone mineral density regions.

Figure 10:
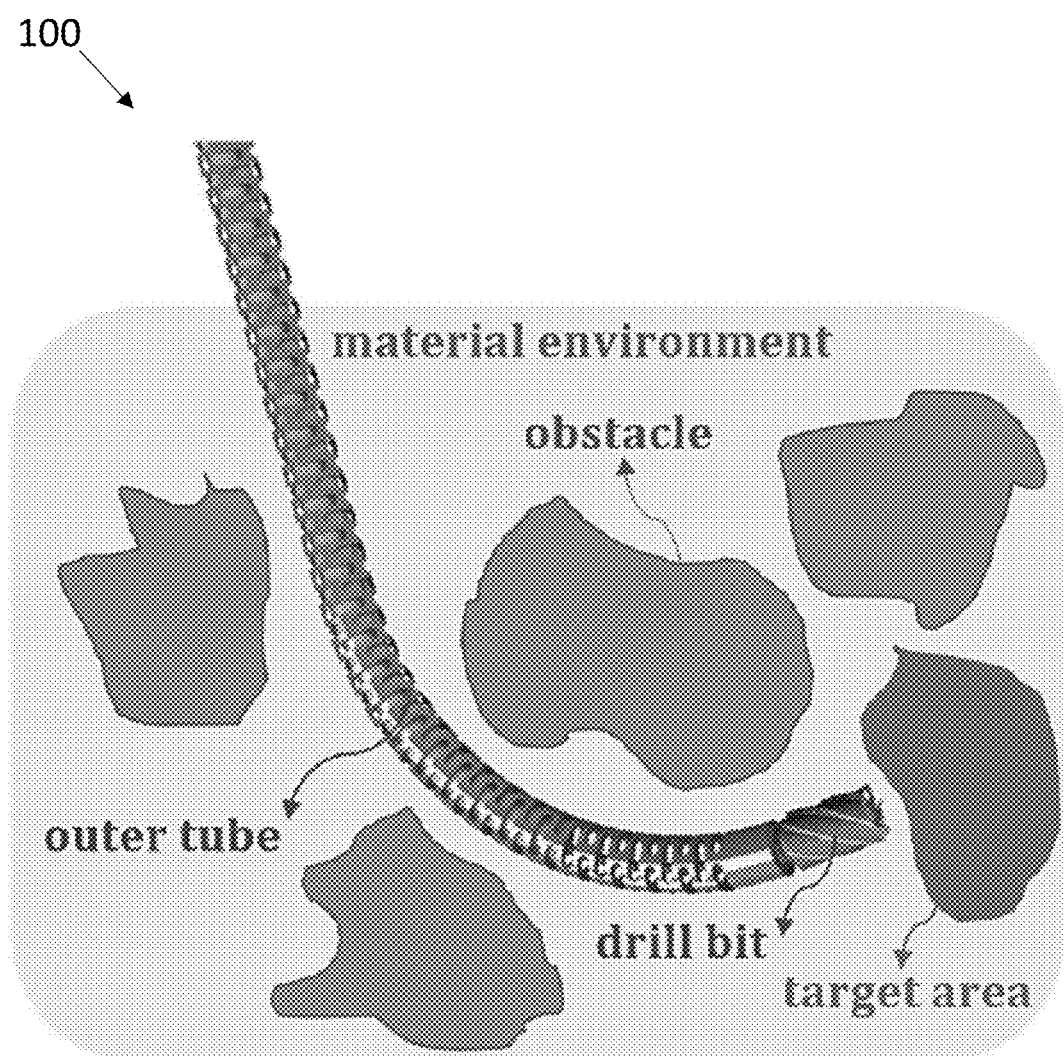
FIG. 10 is a diagram depicting an example operation of an example steerable curved drilling robot device in accordance with some embodiments.

FIG. 10 shows a diagram depicting an example steerable curved drilling robot device 100 in operation. The device 100 can be programmed to follow a drilling trajectory to avoid obstacles and hit a target area. The obstacles and target area can be identified by the characterization of a bone tissue. In some embodiments, the obstacles can include osteoporotic bone, bone with low mineral density, nerves, and/or blood vessels, for example.

Figure 11A:
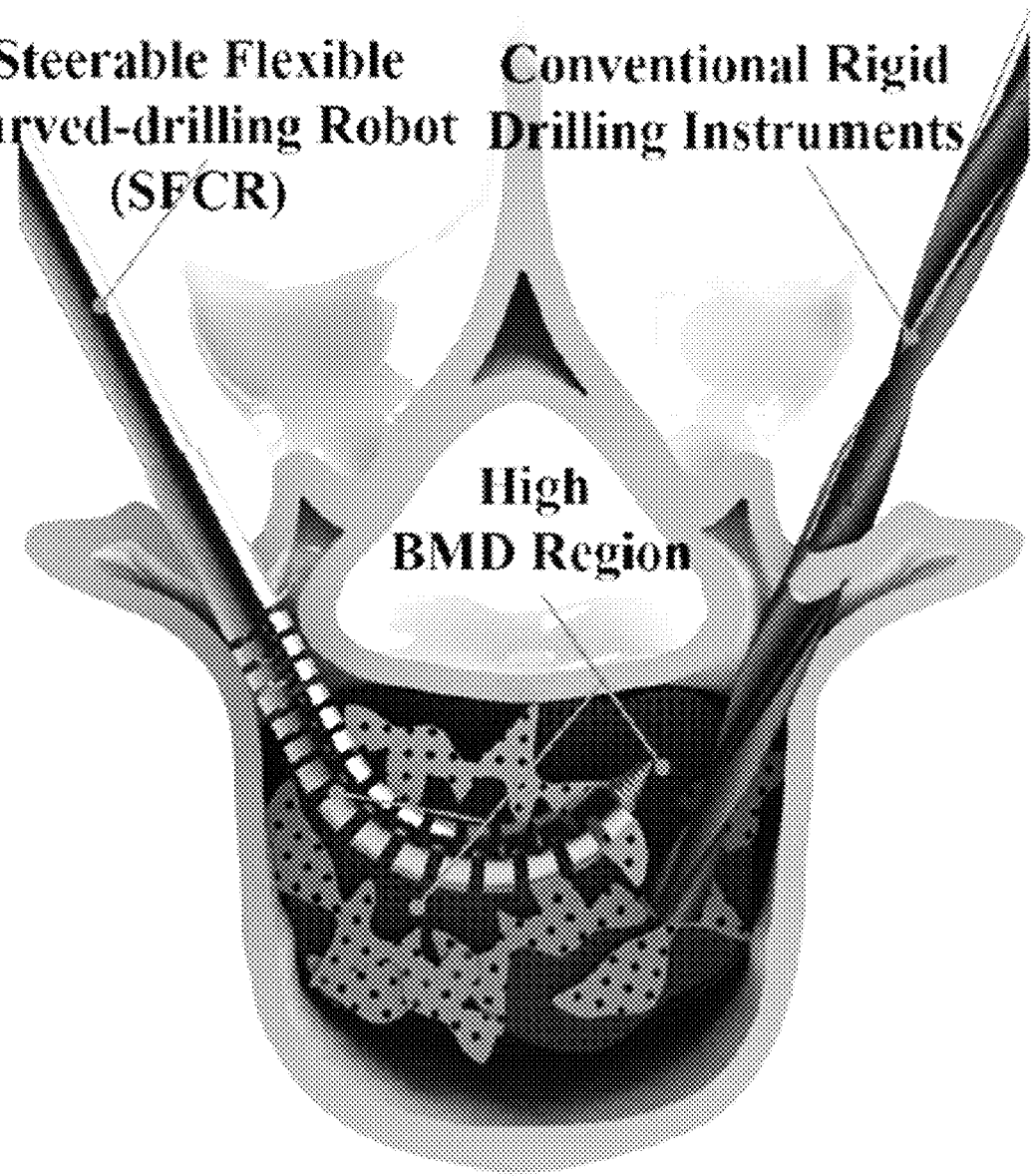
FIGS. 11A through 11C are diagrams depicting example steerable curved drilling robot devices in use in accordance with some embodiments.
Figure 11B:
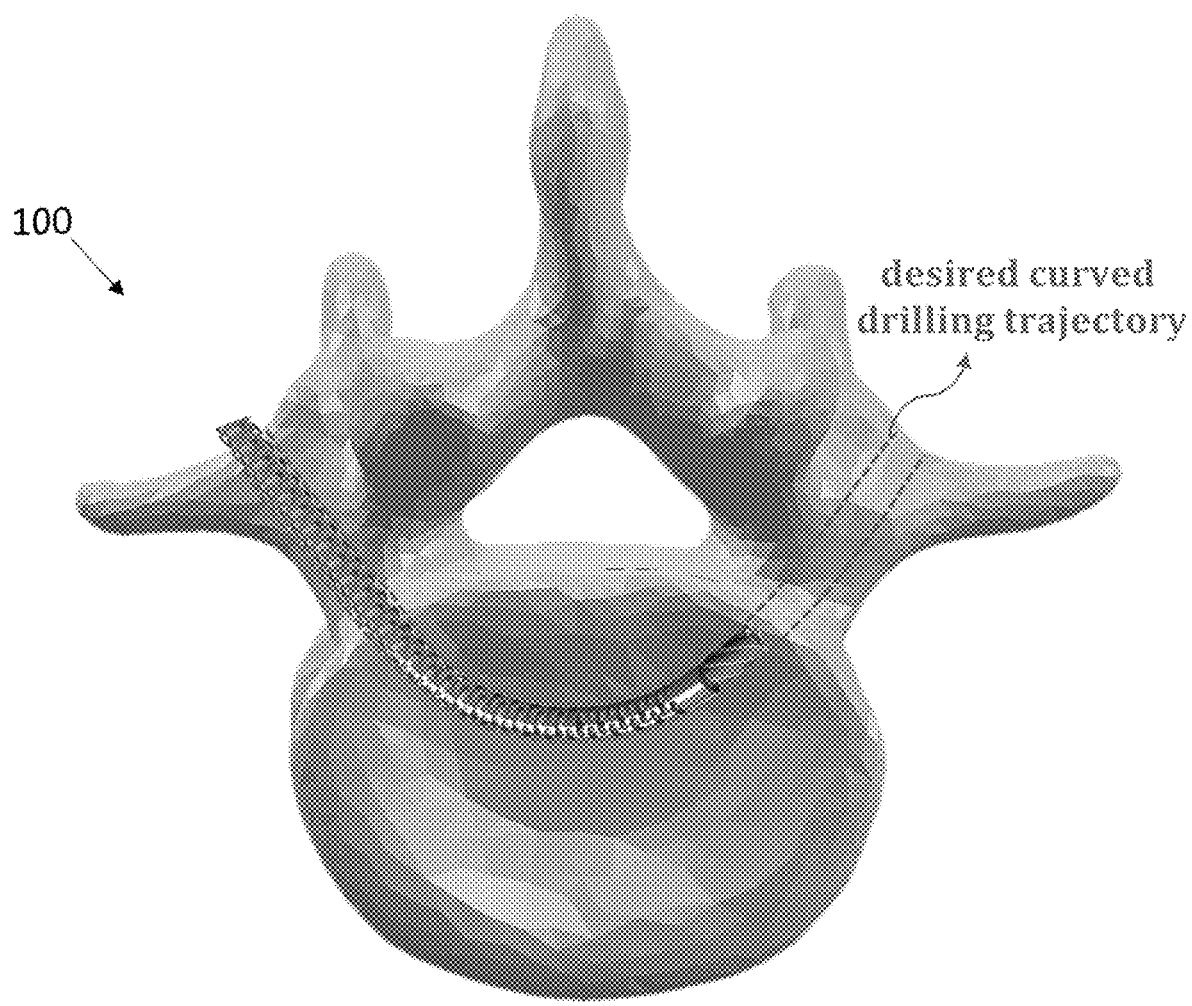
Figure 11C:
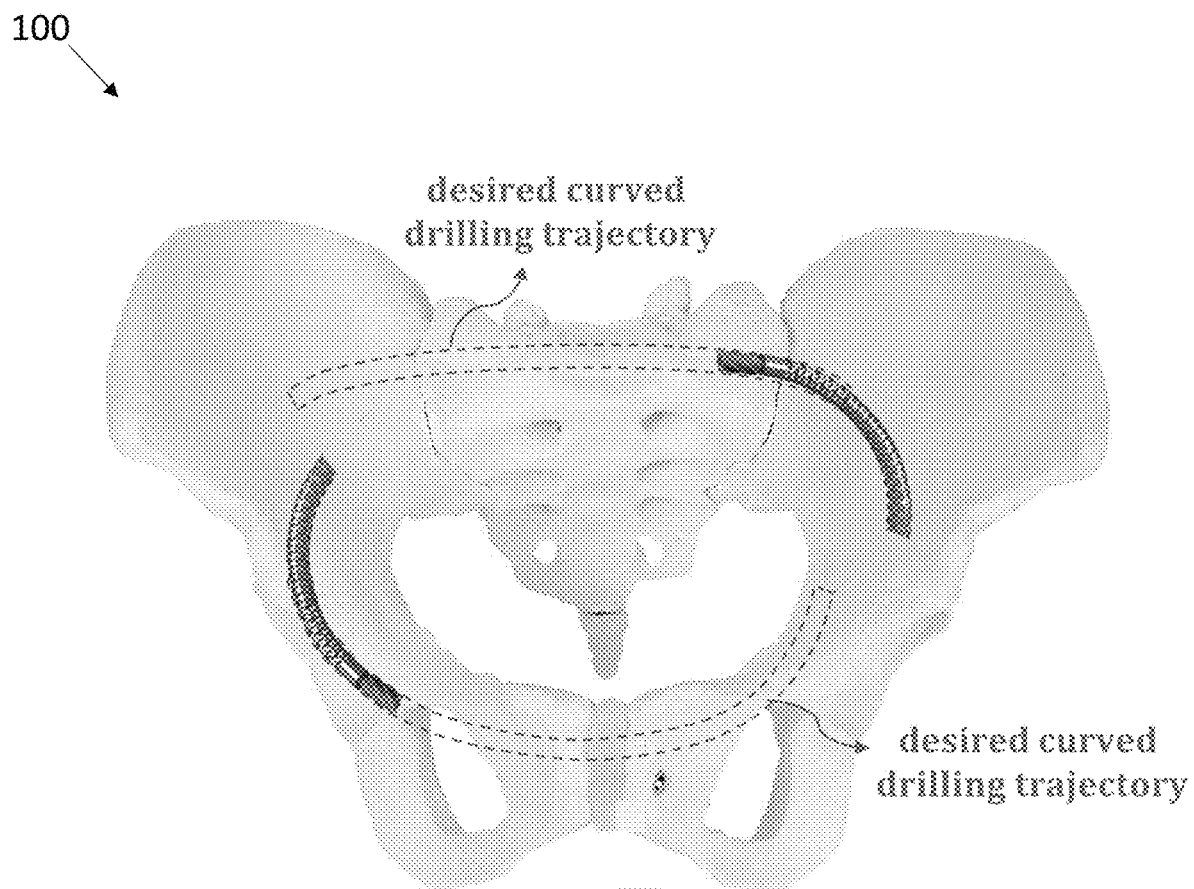

FIG. 11A shows a comparison of operation of a steerable curved drilling robot device 100 compared to a conventional rigid drilling instrument. As shown in the figure, the conventional rigid drilling instrument is limited to a straight trajectory and is unable to avoid obstacles such as osteoporotic bone, bone with low mineral density, nerves, and/or blood vessels, for example, while the device 100 can avoid these obstacles. FIGS. 11A through 11C show example drilling locations for application of the device 100 to complex anatomies, including vertebrae and the pelvis.

In some embodiments, the system 200 can be controlled autonomously and pre-preprogrammed to follow a specific trajectory. In some embodiments, the system 200 can be controlled using a human-robotic interaction interface to tele-operate the drilling system using a device such as joystick, haptic device (e.g., Phantom Omni), a spatial 3D mouse, and/or a custom designed control interface that provides enough degrees of freedom to control the above-mentioned degrees of freedom of the system 200.

Some aspects of the present invention may be made using an additive manufacturing (AM) process. Among the most common forms of additive manufacturing are the various techniques that fall under the umbrella of "3D Printing", including but not limited to stereolithography (SLA), digital light processing (DLP), fused deposition modelling (FDM), selective laser sintering (SLS), selective laser melting (SLM), electronic beam melting (EBM), and laminated object manufacturing (LOM). These methods variously "build" a three-dimensional physical model of a part, one layer at a time, providing significant efficiencies in rapid prototyping and small-batch manufacturing. AM also makes possible the manufacture of parts with features that conventional subtractive manufacturing techniques (for example CNC milling) are unable to create.

Suitable materials for use in AM processes include, but are not limited to, using materials including but not limited to nylon, polyethylene terephthalate (PET), acrylonitrile butadiene styrene (ABS), resin, polylactic acid (PLA), polystyrene, and the like. In some embodiments, an AM process may comprise building a three dimensional physical model from a single material, while in other embodiments, a single AM process may be configured to build the three dimensional physical model from more than one material at the same time.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore specifically point out exemplary embodiments of the present invention, and are not to be construed as limiting in any way the remainder of the disclosure.

Figure 12:
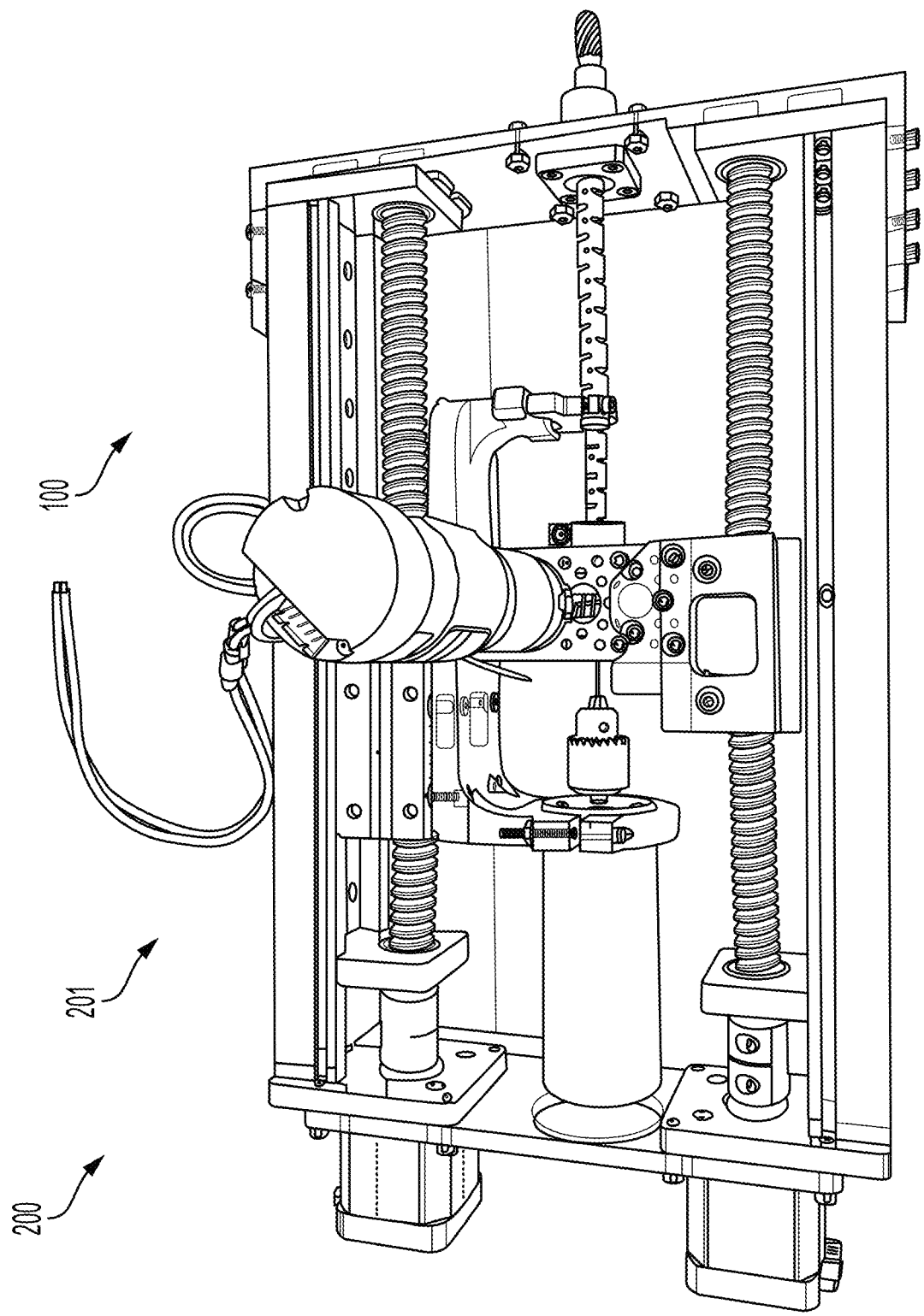
FIG. 12 shows a first view of an example experimental setup of a steerable flexible curved drilling robot system in accordance with some embodiments.
Figure 13:
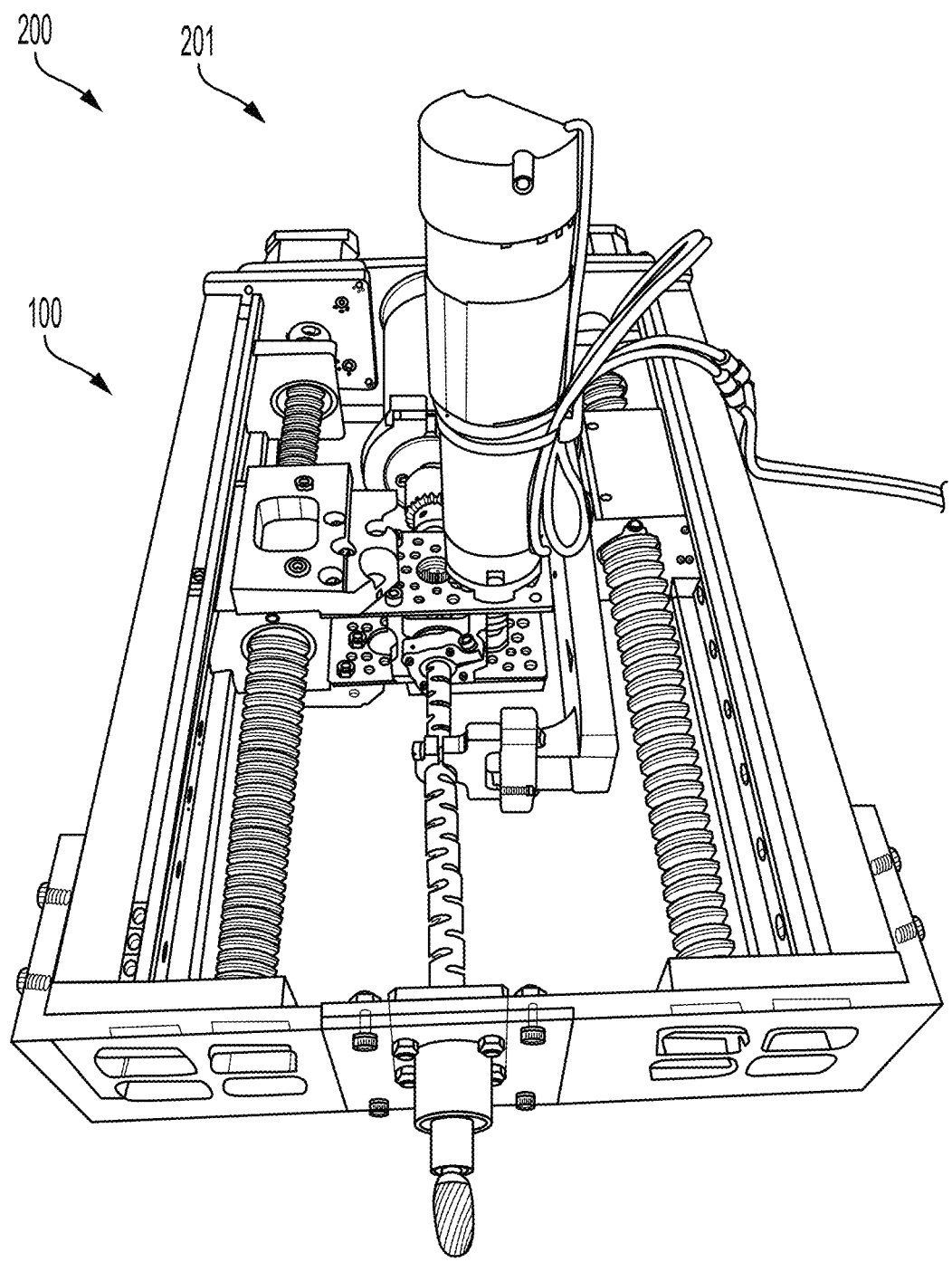
FIG. 13 shows a second view of an example experimental setup of a steerable flexible curved drilling robot system in accordance with some embodiments.
Figure 14:
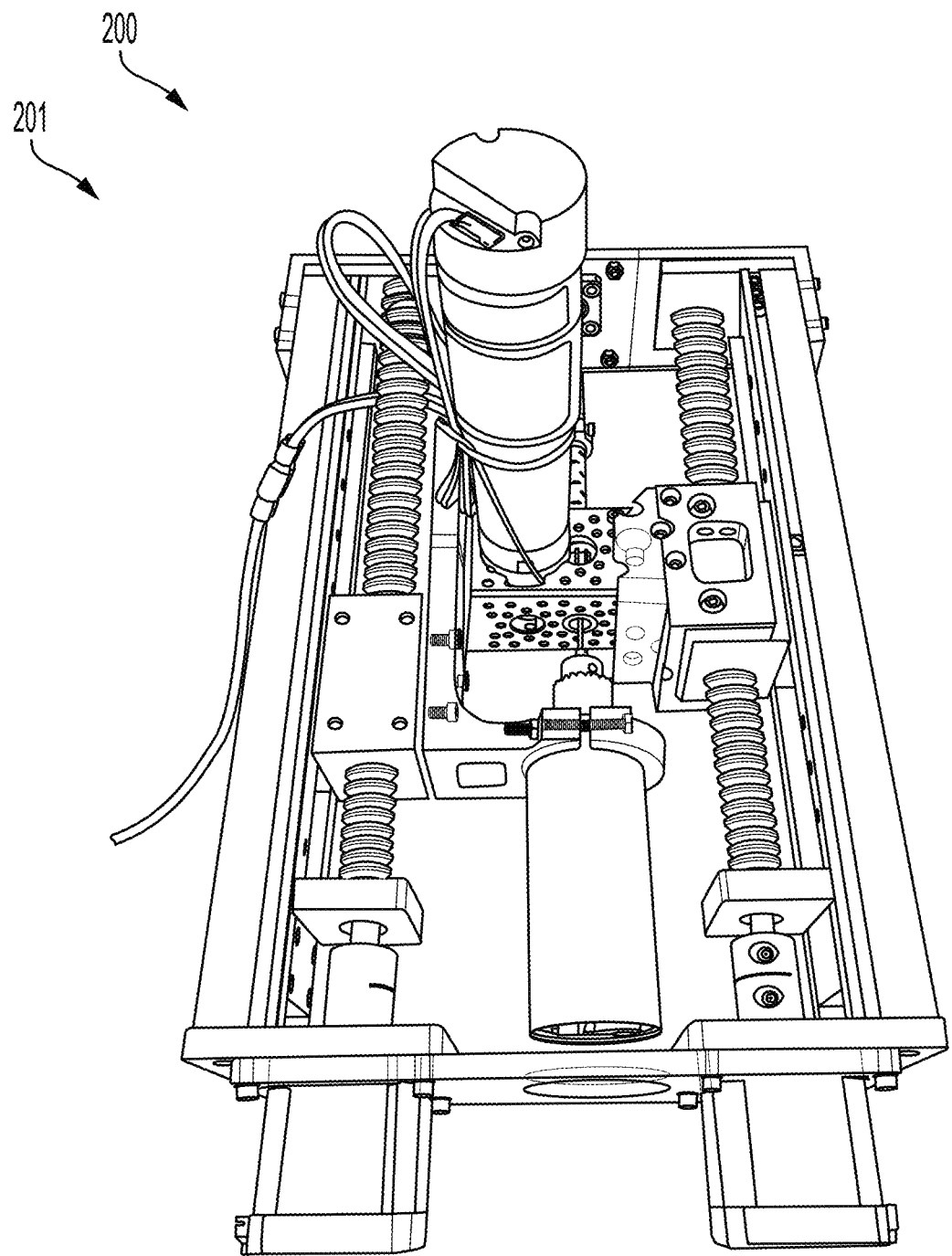
FIG. 14 shows a third view of an example experimental setup of a steerable flexible curved drilling robot system in accordance with some embodiments.
Figure 15:
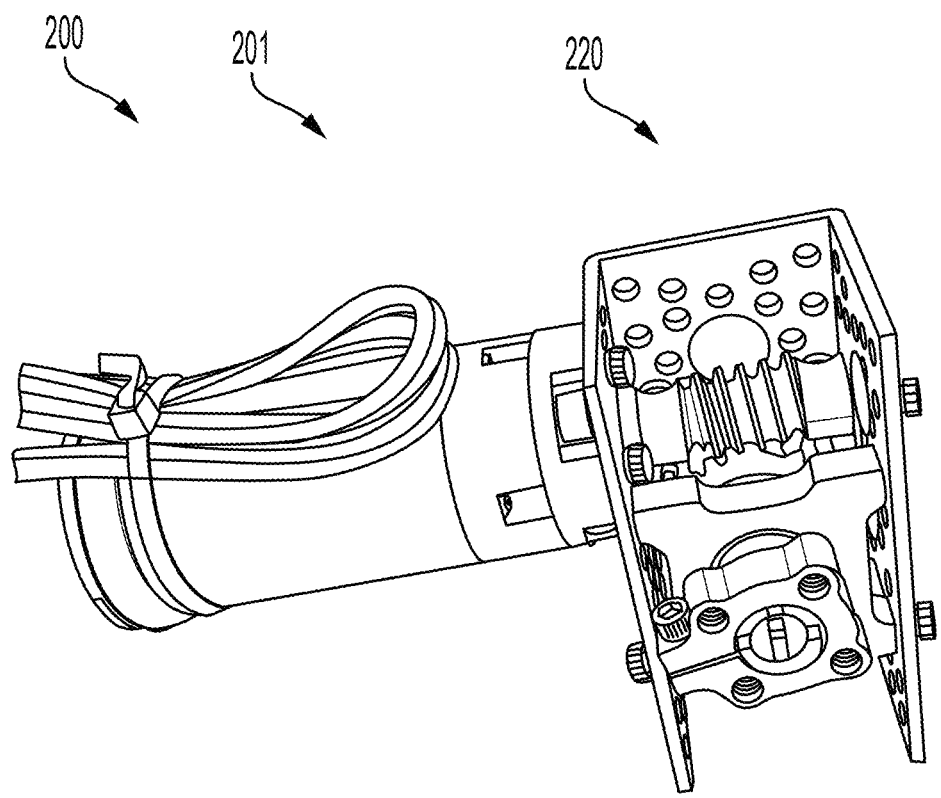
FIG. 15 shows an example experimental setup of part of a steerable flexible curved drilling robot system in accordance with some embodiments.

FIGS. 12, 13, 14 and 15 depict images of various views of an example experimental steerable flexible curved drilling robot system. FIG. 12 is a side perspective view, FIG. 13 is a distal end 101 perspective view, and FIG. 14 is a perspective view opposite that of FIG. 13. FIG. 15 shows a view detailing portions of the second rotational actuation device 220 including a worm-gear set 250 used to supply a torque to the inner flexible tube 125. While specific examples for the motors (230, 245, 255), slides 240, lead screws 225, rails 235, gears 250 and other components are shown, any suitable components or combinations thereof can be utilized to perform the necessary tasks to operate the robot device 100.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A fully steerable flexible curved drilling robot device, comprising:
a first flexible tube including a proximal end, a distal end, and a concentric through hole centered on a longitudinal axis extending from the proximal end to the distal end;
a second flexible tube including a proximal end, a distal end, and an eccentric through hole extending from the proximal end to the distal end, wherein the second flexible tube is positioned in the concentric though hole of the first flexible tube, and configured to move translationally along the longitudinal axis and rotationally about the longitudinal axis; and
a drill bit connected via a bearing to a flexible drive shaft, the drill bit positioned at the distal end of the first flexible tube, and wherein the flexible drive shaft extends through the eccentric through hole of the second flexible tube and is configured to provide a rotational torque to the drill bit.

2. The device of claim 1, wherein the first flexible tube comprises at least one of Nitinol, titanium, stainless steel, 3D printed biocompatible resin, and 3D printed metal.

3. The device of claim 1, wherein the first flexible tube has a diameter in the range of 2 mm to 10 mm, a length in the range of 20 mm to 500 mm, and a wall thickness in the range of 0.05 mm to 2 mm.

4. The device of claim 1, wherein the concentric through hole of the first flexible tube has a diameter in the range of 1 mm to 10 mm.

5. The device of claim 1, wherein the second flexible tube comprises at least one of Nitinol, titanium, stainless steel, 3D printed biocompatible resin, and 3D printed metal.

6. The device of claim 1, wherein the second flexible tube has a diameter in the range of 1 mm to 10 mm, a length in the range of 20 mm to 500 mm, and a wall thickness in the range of 0.05 mm to 2 mm.

7. The device of claim 1, wherein the eccentric through hole of the second flexible tube has a diameter in the range of 0.1 mm to 5 mm.

8. The device of claim 1, wherein the flexible drive shaft comprises at least one of Nitinol, titanium, stainless steel, 3D printed biocompatible resin, and 3D printed metal.

9. The device of claim 1, wherein the flexible drive shaft has a diameter in the range of 0.5 mm to 5 mm, and a length in the range of 20 mm to 500 mm.

10. The device of claim 1, wherein the drill bit comprises at least one of high-speed steel, diamond, and biocompatible hard material, and at least one of a ball, a conical and a spherical shape.

11. The device of claim 1, wherein a combination of a rotation and a translation of the second flexible tube relative to the first flexible tube is configured to control directionality of a tip of the drill bit.

12. A fully steerable flexible curved drilling robot system, comprising:
an actuation system configured to provide a first torque, a second torque, a first translational force, and a second translational force; and
a fully steerable flexible curved drilling robot device movably connected to the actuation system, comprising:
a first flexible tube including a proximal end, a distal end, and a concentric through hole centered on a longitudinal axis extending from the proximal end to the distal end;
a second flexible tube including a proximal end, a distal end, and an eccentric through hole extending from the proximal end to the distal end, wherein the second flexible tube is positioned in the concentric though hole of the first flexible tube, and configured to move translationally along the longitudinal axis and rotationally about the longitudinal axis, and
a drill bit connected via a bearing to a flexible drive shaft, the drill bit positioned at the distal end of the first flexible tube, and wherein the flexible drive shaft extends through the eccentric through hole of the second flexible tube and is configured to transfer the first torque from the actuation system to the drill bit.

13. The system of 12, wherein the actuation system comprises:
a first linear actuation device configured to provide the first translational force to the first flexible tube;
a second linear actuation device configured to provide the second translational force to the second flexible tube;
a first rotational actuation device configured to provide the first torque to the flexible drive shaft and drill bit; and
a second rotational actuation device configured to provide the second torque to the second flexible tube.

14. The system of 13, wherein:
the first and second linear actuation devices each comprise a leadscrew, stepper motor, rail, and a slide;
the first rotational actuation device comprises a DC motor; and
the second rotational actuation device comprises a worm gear set and a planetary gear stepper motor.

15. A fully steerable curved drilling method, comprising:
providing a fully steerable flexible curved drilling robot device comprising:
a first flexible tube including a proximal end, a distal end, and a concentric through hole centered on a longitudinal axis extending from the proximal end to the distal end;
a second flexible tube including a proximal end, a distal end, and an eccentric through hole extending from the proximal end to the distal end, wherein the second flexible tube is positioned in the concentric though hole of the first flexible tube, and configured to move translationally along the longitudinal axis and rotationally about the longitudinal axis; and
a drill bit connected via a spherical bearing to a flexible drive shaft, the drill bit positioned at the distal end of the first flexible tube, and wherein the flexible drive shaft extends through the eccentric through hole of the second flexible tube and is configured to provide a rotational torque to the drill bit; and
steering the drill bit via a combination of a first torque, a second torque, a first translational force, and a second translational force to drill a drilling trajectory.

16. The method of claim 15, further comprising characterizing a target bone tissue including identifying regions of osteoporotic bone and bone with low mineral density, and forming the drilling trajectory based on the characterization.

17. The method of claim 16, wherein the drilling trajectory is configured to avoid the identified regions of osteoporotic bone and bone with low mineral density.

18. The method of claim 16, wherein the drilling trajectory is configured to follow a three dimensional curved, long, and complex anatomy in which nerves and vessels need to be avoided during a drilling procedure.

19. The method of claim 16, wherein the step of characterizing the target bone tissue comprises the steps of:
performing one or more quantitative computed tomography (QCT) scans on the target bone tissue;
converting the one or more QCT scans into a three-dimensional finite element model of the target bone tissue; and
demarcating osteoporotic regions or low bone mineral density regions in the three-dimensional finite element model.

20. The method of claim 15, wherein the first torque, second torque, first translational force, and second translational force are provided by an actuation system.

21. The method of claim 20, wherein the actuation system comprises:
a first linear actuation device configured to provide the first translational force to the first flexible tube;
a second linear actuation device configured to provide the second translational force to the second flexible tube;
a first rotational actuation device configured to provide the first torque to the flexible drive shaft and drill bit; and
a second rotational actuation device configured to provide the second torque to the second flexible tube.

* * * * *